United States Patent
Sohn et al.

(10) Patent No.: US 10,100,193 B2
(45) Date of Patent: *Oct. 16, 2018

(54) POLYMER RESIN COMPOSITION AND MOLDED ARTICLE THEREOF

(71) Applicant: SK CHEMICALS CO., LTD., Gyeonggi-do (KR)

(72) Inventors: Dong-Cheol Sohn, Gyeonggi-do (KR); Kye Yune Lee, Gyeonggi-do (KR); Tae-Woong Lee, Gyeonggi-do (KR); Jong-Wook Shin, Gyeonggi-do (KR)

(73) Assignee: SK CHEMICALS CO., LTD. (KR)

( * ) Notice: Subject to any disclaimer, the term of this patent is extended or adjusted under 35 U.S.C. 154(b) by 224 days.

This patent is subject to a terminal disclaimer.

(21) Appl. No.: 14/916,446

(22) PCT Filed: Sep. 4, 2014

(86) PCT No.: PCT/KR2014/008322
§ 371 (c)(1),
(2) Date: Mar. 3, 2016

(87) PCT Pub. No.: WO2015/034286
PCT Pub. Date: Mar. 12, 2015

(65) Prior Publication Data
US 2016/0251512 A1     Sep. 1, 2016

(30) Foreign Application Priority Data
Sep. 4, 2013     (KR) .................. 10-2013-0106207

(51) Int. Cl.
C08L 69/00     (2006.01)
C08L 67/00     (2006.01)
C08L 67/02     (2006.01)
C08L 67/03     (2006.01)

(52) U.S. Cl.
CPC ........... C08L 69/00 (2013.01); *C08L 2201/08* (2013.01); *C08L 2205/025* (2013.01); *C08L 2205/035* (2013.01); *C08L 2205/06* (2013.01); *C08L 2205/08* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 5,124,402 A | 6/1992 | Bosnyak et al. | |
| 5,362,581 A * | 11/1994 | Chang | H01M 2/14 429/129 |
| 5,369,154 A * | 11/1994 | Laughner | C08L 67/00 523/436 |
| 5,733,959 A * | 3/1998 | Heitz | C07C 267/00 524/195 |
| 8,440,762 B2 | 5/2013 | Van Der Mee et al. | |
| 9,725,592 B2 * | 8/2017 | Sohn | C08L 55/02 |
| 2008/0119617 A1 | 5/2008 | Chakravarti et al. | |
| 2008/0132641 A1 | 8/2008 | Xiangyang et al. | |
| 2010/0168314 A1 | 7/2010 | Chakravarti et al. | |
| 2010/0188317 A1 | 7/2010 | Cahoon-Brister | |
| 2012/0129989 A1 | 5/2012 | Kim et al. | |
| 2014/0087105 A1 * | 3/2014 | Formato | C09K 5/063 428/35.2 |
| 2016/0137834 A1 * | 5/2016 | Sohn | C08L 69/00 524/195 |
| 2016/0137835 A1 * | 5/2016 | Sohn | C08L 67/02 523/436 |
| 2016/0369094 A1 * | 12/2016 | Sohn | C08L 51/04 |

FOREIGN PATENT DOCUMENTS

| | | |
|---|---|---|
| CN | 101180365 | 5/2008 |
| CN | 101787195 | 7/2010 |
| JP | H06-505300 | 6/1994 |
| JP | H10-505370 | 5/1998 |
| JP | 2001-139789 | 5/2001 |
| JP | 2002-348472 | 12/2002 |
| JP | 2003-525335 | 8/2003 |
| JP | 2008-115295 A | 5/2008 |
| KR | 10-2005-0104653 A | 11/2005 |
| KR | 10-0694504 B1 | 3/2007 |
| KR | 10-2007-0068793 A | 7/2007 |
| KR | 10-0804173 B1 | 2/2008 |
| KR | 10-2008-0072693 A | 8/2008 |
| KR | 10-2009-0080132 A | 7/2009 |
| KR | 10-2011-0111392 A | 10/2011 |

(Continued)

OTHER PUBLICATIONS

International Search Report and Written Opinion prepared by the Korean International Property Office dated Dec. 15, 2014, for International Application No. PCT/KR2014/008322.

(Continued)

*Primary Examiner* — Michael J Feely

(74) *Attorney, Agent, or Firm* — Sheridan Ross P.C.

(57) ABSTRACT

The present invention relates to a polymer resin composition including: one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit, and a molded article thereof.

According to the present invention, a polymer resin composition providing an environment-friendly biomass-containing synthetic resin representing improved chemical resistance, and a polymer resin molded article obtained using the same may be provided.

17 Claims, No Drawings

(56) References Cited

FOREIGN PATENT DOCUMENTS

| KR | 10-2011-0111394 A | 10/2011 | |
|---|---|---|---|
| WO | WO 92/03504 | 3/1992 | |
| WO | WO 2014/164623 A1 * | 10/2014 | ............. C08L 69/00 |

OTHER PUBLICATIONS

Extended Search Report for European Patent Application No. 14842517.6, dated Mar. 1, 2017, 6 pages.

* cited by examiner

US 10,100,193 B2

POLYMER RESIN COMPOSITION AND MOLDED ARTICLE THEREOF

CROSS REFERENCE TO RELATED APPLICATIONS

This application is a national stage application under 35 U.S.C. 371 and claims the benefit of PCT Application No. PCT/KR2014/008322 having an international filing date of Sep. 4, 2014, which designated the United States, which PCT application claimed the benefit of Korean Patent Application No. 10-2013-0106207 filed Sep. 4, 2013, the disclosures of each of which are incorporated herein by reference.

TECHNICAL FIELD

The present invention relates to a polymer resin composition, and more particularly to a polymer resin composition capable of providing an environment-friendly biomass-containing synthetic resin representing improved chemical resistance, and a molded article thereof.

BACKGROUND OF THE INVENTION

A polyester resin is, due to the properties of relatively excellent thermal resistance, mechanical strength and elastic strength, widely used as reinforced plastic, coatings, films, resins for molding, and the like, and also used as fiber materials of clothes.

Recently, the polyester resin is, due to the characteristic physical properties thereof, increasingly used in the fields of building interiors, molded signs, or the like. However, the polyester resin has thermal resistance lower than other polymer materials, for example, acryl-based materials or polycarbonate-based materials, and thus, is unsuitable for use as exterior materials for outdoor use of which the temperature is very fluctuate depending on the season.

Meanwhile, a polycarbonate resin is, due to its excellent properties such as impact resistance or thermal resistance, used in the various fields such as the appearance, packaging materials, cases, boxes, interior and exterior materials of various building materials and electronic products. This polycarbonate resin is much demanded due to its excellent mechanical properties, however, has exterior colors changed, or cracks caused by various cleaning agents, women's cosmetics, baby hand sanitizers, and the like commonly used in the market, and the deterioration of a polycarbonate product is caused by various household chemicals.

Various attempts has been made in order to solve the problems of the polyester resin or polycarbonate resin, and studies of the method of blending the polyester resin and the polycarbonate resin have been continuously conducted.

In addition, a technique of blending an acrylonitrile-butadiene-styrene (ABS)-based graft copolymer and the like with a polycarbonate resin to improve impact resistance and thermal resistance has been developed, however, the technique has a limitation in that the biomass product is not environment-friendly. Meanwhile, since the polyester resin and the polycarbonate have different melt viscosity and molecular structure from each other, there was a limitation in improving the thermal resistance simply by blending them.

In addition, in order to maintain the mechanical properties, in particular the thermal resistance, while increasing the chemical resistance of polycarbonate, various methods were used, however, the improvement of the chemical resistance was not enough to be applied to the actual industry, and the exterior properties of the manufactured resin product were deteriorated. Further, in order to improve the thermal resistance and the chemical resistance at the same time, a method of further blending one or more materials was attempted, however, it was difficult to express an appropriate level of chemical resistance.

Meanwhile, generally, as an engineering plastic of which the use is rapidly increased, ABS (acrylonitrile-butadiene-styrene) or PC/ABS (polycarbonate/ABS) may be mentioned, and PC/ABS was developed in order to utilize the excellent thermal resistance, impact resistance and self-extinguishability of PC and the processability and economic feasibility of ABS. However, this PC/ABS is vulnerable to some chemicals such as aromatic hydrocarbon, acetone, and alcohols, and when the PC/ABS is in direct contact with those chemicals for a long time, discoloration, swelling and cracks occur, and the values as a product is lost. Therefore, many studies of preparing a resin composition having chemical resistance better than that of the conventional ABS or PC/ABS has been conducted. By way of example, in order to improve the chemical resistance of ABS, mixing a polyolefin resin having excellent chemical resistance to be used has been reported, however, for improving compatibility of an incompatible material, a block copolymer and the like should be used as a compatibilizer, and in the case of being applied in practice, phase separation occurs, thereby rapidly lowering mechanical properties.

Thus, there is needed development of an environment-friendly biomass resin composition capable of increasing chemical resistance while maintaining impact resistance and thermal resistance.

SUMMARY OF THE INVENTION

The present invention has been made in an effort to provide a polymer resin composition providing an environment-friendly biomass-containing synthetic resin representing improved chemical resistance, while expressing excellent impact resistance and thermal resistance.

Further, the present invention has been made in an effort to provide a molded article including the polymer resin composition.

An exemplary embodiment of the present invention provides a polymer resin composition including: one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit.

Further, the polymer resin composition may have a tensile strength loss rate represented by the following General Formula 1 of 0.5 to 10%:

Tensile strength loss rate (%)=[(tensile strength before test−tensile strength after test/tensile strength before test]×100     [General Formula 1]

wherein the tensile strength before test, and the tensile strength after test are measured as follows:

a pellet prepared by uniformly extruding the polymer resin composition is injected at an injection temperature of 250° C.; the injected tensile strength specimen is conditioned at 23±2° C. under a condition of relative humidities of 50±5% for 24 hours; and then the tensile strength before test is measured, and a chemical resistant test fixture is manufactured at a critical deformation of 2.2%; the specimen is fixed by the test fixture; an aromatic/aliphatic chemical blend product or a UV blocker is applied on the specimen for 1 minute; the specimen is left at 23±2° C. for 72 hours; and then the tensile strength after test is measured, with a proviso that the aromatic/aliphatic chemical blend product includes 10 to 90 wt % of ethanol, and as a detailed component, further includes one or more selected from the group consisting of aliphatic and aromatic alcohols, aliphatic and aromatic esters, aromatic aldehydes, unsaturated hydrocarbons, saturated hydrocarbons, aliphatic amines, aliphatic diamines, and terpene.

Further, the polymer resin composition may include 1 wt % to 50 wt % of the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; 1 wt % to 50 wt % of the polyester resin; 20 wt % to 90 wt % of the polycarbonate resin; and 1 wt % to 20 wt % of the block copolymer including two or more alkylene-based repeating units having 2 to 10 carbon atoms and an aromatic vinyl-based repeating unit.

A weight ratio between the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and the block copolymer including two or more alkylene-based repeating units having 2 to 10 carbon atoms and an aromatic vinyl-based repeating unit may be 2:1 to 10:1.

A weight ratio of the polyester resin and the polycarbonate resin to the block copolymer including two or more alkylene-based repeating units having 2 to 10 carbon atoms and an aromatic vinyl-based repeating unit may be 1:15 to 1:30.

The block copolymer including two or more alkylene-based repeating units having 2 to 10 carbon atoms and an aromatic vinyl-based repeating unit may include a block copolymer including an aromatic vinyl-based repeating unit, an alkylene-based repeating unit having 2 to 3 carbon atoms, and an alkylene-based repeating unit having 4 to 10 carbon atoms.

The block copolymer including an aromatic vinyl-based repeating unit, an alkylene-based repeating unit having 2 to 3 carbon atoms, and an alkylene-based repeating unit having 4 to 10 carbon atoms may include 10 wt % to 30 wt % of the aromatic vinyl-based repeating unit.

The block copolymer including an aromatic vinyl-based repeating unit, an alkylene-based repeating unit having 2 to 3 carbon atoms, and an alkylene-based repeating unit having 4 to 10 carbon atoms may have a melt flow rate (MFR) of 8 g/10 min to 20 g/10 min under a condition of a temperature of 230° C. and a load of 2.16 kg.

The block copolymer including an aromatic vinyl-based repeating unit, an alkylene-based repeating unit having 2 to 3 carbon atoms, and an alkylene-based repeating unit having 4 to 10 carbon atoms may have a density of 0.78 g/cm³ to 0.98 g/cm³.

The block copolymer including an aromatic vinyl-based repeating unit, an alkylene-based repeating unit having 2 to 3 carbon atoms, and an alkylene-based repeating unit having 4 to 10 carbon atoms may include a styrene-ethylene-butylene-styrene block copolymer.

The unsaturated nitrile-diene-based rubber-aromatic vinyl graft copolymer may have a structure of a core having an average particle diameter of 0.01 μm to 5 μm, and a glass transition temperature of −20° C. or less; and a shell having a glass transition temperature of −20° C. or more.

The polyester resin may include polytrimethylene terephthalate.

In addition, the polytrimethylene terephthalate may have a weight average molecular weight (evaluated by GPC) of 10,000 g/mol to 150,000 g/mol.

Further, the polycarbonate may have a glass transition temperature of 50 to 200° C., and a weight average molecular weight (evaluated by GPC) of 10,000 g/mol to 200,000 g/mol.

Further, the polymer resin composition may further include one or more selected from the group consisting of unsaturated nitrile-aromatic vinyl-glycidyl methacrylate-based compatibilizer, unsaturated nitrile-aromatic vinyl-maleic anhydride acid-based compatibilizer, saturated ethylene-alkyl acrylate-glycidyl methacrylate-based compatibilizer, and carbodiimide-based anti-hydrolysis agent.

Meanwhile, the polymer resin composition may further include one or more additives selected from the group consisting of an antioxidant, a lubricant, a photostabilizer, a photoabsorbent, a transesterification inhibitor, and an anti-hydrolysis agent.

And, another embodiment of the present invention provides a polymer resin molded article including the polymer resin composition as described above.

Further, the polymer resin molded article may have one or more uses selected from the group consisting of automotive parts, parts for electrical and electronic equipment, parts for home appliances, parts for office equipment, and parts for household goods.

According to the present invention, a polymer resin composition providing an environment-friendly biomass-containing synthetic resin representing improved chemical resistance, while expressing excellent impact resistance and thermal resistance, and a polymer resin molded article obtained using the same.

DETAILED DESCRIPTION OF THE INVENTION

In the present specification, a polymer resin composition including: one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit is provided.

Further, in the present specification, a molded article including the polymer resin composition is provided.

Hereinafter, a polymer resin composition and a molded article thereof according to exemplary embodiment of the present invention will be described in more detail.

According to an exemplary embodiment of the present invention, a polymer resin composition including: one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit may be provided The present inventors conducted a study of a high thermal resistant resin composition which is environment-friendly, and has improved chemical resistance or environmental stress crack resistance, and have found out from experiments that a polymer resin composition including: one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit may express the physical properties such as high thermal resistance while representing improved chemical resistance or environmental stress crack resistance, and completed the present invention.

Further, the polymer resin composition may have a tensile strength loss rate represented by the following General Formula 1 of 0.5 to 10%, or 1 to 8%, or 1.5 to 7%:

Tensile strength loss rate (%)=[(tensile strength before test−tensile strength after test/tensile strength before test]×100, [General Formula 1]

wherein the tensile strength before test, and the tensile strength after test are measured as follows:

a pellet prepared by uniformly extruding the polymer resin composition is injected at an injection temperature of 250° C.; the injected tensile strength specimen is conditioned at 23±2° C. under a condition of relative humidities of 50±5% for 24 hours; and then the tensile strength before test was measured, to determine the tensile strength loss rate (%), and a chemical resistant test fixture is manufactured at a critical deformation of 2.2%; the specimen is fixed by the test fixture; an aromatic/aliphatic chemical blend product or a UV blocker is applied on the specimen for 1 minute; the specimen is left at 23±2° C. for 72 hours; and then the tensile strength after test was measured to determine the tensile strength loss rate (%), thereby comparing and judging an excellence degree of chemical resistance.

In the above, the aromatic/aliphatic chemical blend product includes 10 to 90 wt % of ethanol, and further one or more selected from the group consisting of aliphatic and aromatic alcohols, aliphatic and aromatic esters, aromatic aldehydes, unsaturated hydrocarbons, saturated hydrocarbons, aliphatic amines, aliphatic diamines, and terpene.

As the tensile strength loss rate (%) is low, the polymer resin composition may have an excellent chemical resistance property.

In the course of preparing the polymer resin composition, a common method or equipment used to prepare a blend or mixture of the polymer resin may be used without particular limitation. For example, one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; a polyester resin; a polycarbonate resin; and a block copolymer including two or more alkylene-based repeating units having 2 to 10 carbon atoms and an aromatic vinyl-based repeating unit may be added to a common mixing machine, mixer or tumbler, and mixed through a twin-screw extruder, thereby providing the polymer resin composition. In the course of preparing the polymer resin composition, it is preferred that each resin is used in a sufficiently dried state.

The polymer resin composition may include 1 wt % to 50 wt % of the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer; 1 wt % to 50 wt % of the polyester resin; 20 wt % to 90 wt % of the polycarbonate resin; and 1 wt % to 20 wt % of the block copolymer including two or more alkylene-based repeating units having 2 to 10 carbon atoms and an aromatic vinyl-based repeating unit.

When the content of the block copolymer including the two or more alkylene-based repeating units having 2 to 10 carbon atoms and the aromatic vinyl-based repeating unit is 1 wt % to 20 wt %, relative to the entire polymer resin composition, the chemical resistance or environmental stress crack resistance may be more improved.

A weight ratio between the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and the block copolymer including two or more alkylene-based repeating units having 2 to 10 carbon atoms and an aromatic vinyl-based repeating unit may be 2:1 to 10:1, or 2.5:1 to 8:1.

When the weight ratio between the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and the block copolymer including two or more alkylene-based repeating units having 2 to 10 carbon atoms and an aromatic vinyl-based repeating unit is less than 2:1, the content of the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer is excessively decreased, thereby reducing impact resistance.

Further, when the weight ratio between the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and the block copolymer including two or more alkylene-based repeating units having 2 to 10 carbon atoms and an aromatic vinyl-based repeating unit is more than 10:1, it may be difficult for the polymer resin composition to implement sufficient chemical resistance.

The weight ratio of the polyester resin and the polycarbonate resin to the block copolymer including two or more alkylene-based repeating units having 2 to 10 carbon atoms and an aromatic vinyl-based repeating unit may be 1:15 to 1:30, or 1:15.5 to 1:26.

The block copolymer including two or more alkylene-based repeating units having 2 to 10 carbon atoms and an aromatic vinyl-based repeating unit may include a block copolymer including an aromatic vinyl-based repeating unit, an alkylene-based repeating unit having 2 to 3 carbon atoms, and an alkylene-based repeating unit having 4 to 10 carbon atoms.

The block copolymer including an aromatic vinyl-based repeating unit, an alkylene-based repeating unit having 2 to 3 carbon atoms, and an alkylene-based repeating unit having 4 to 10 carbon atoms may include 10 wt % to 30 wt %, or 15 wt % to 25 wt %, or 18 wt % to 22 wt % of the aromatic vinyl-based repeating unit. As the block copolymer including an aromatic vinyl-based repeating unit, an alkylene-based repeating unit having 2 to 3 carbon atoms, and an alkylene-based repeating unit having 4 to 10 carbon atoms includes the above-described certain amount of the aromatic vinyl-based repeating unit, the polymer resin composition may have excellent flexibility, fluidity and processability.

Specifically, the block copolymer including an aromatic vinyl-based repeating unit, an alkylene-based repeating unit having 2 to 3 carbon atoms, and an alkylene-based repeating unit having 4 to 10 carbon atoms may have a melt flow rate (MFR) of 8 g/10 min to 20 g/10 min, or 10 g/10 min to 15 g/10 min, or 12 g/10 min to 14 g/10 min under a condition of a temperature of 230° C. and a load of 2.16 kg. The melt flow rate (MFR) refers to a flow rate when melt is extruded from a piston under a determined constant condition.

Further, the block copolymer including an aromatic vinyl-based repeating unit, an alkylene-based repeating unit having 2 to 3 carbon atoms, and an alkylene-based repeating unit having 4 to 10 carbon atoms may have a density of 0.78 g/cm$^3$ to 0.98 g/cm$^3$, or 0.82 g/cm$^3$ to 0.95 g/cm$^3$, or 0.85 g/cm$^3$ to 0.90 g/cm$^3$.

The block copolymer including an aromatic vinyl-based repeating unit, an alkylene-based repeating unit having 2 to 3 carbon atoms, and an alkylene-based repeating unit having 4 to 10 carbon atoms may include a styrene-ethylene-butylene-styrene block copolymer. The block copolymer is made up of a number of constituent units, as a part of a polymer molecule, and refers to a polymer formed by linearly connecting plural blocks, in which the adjacent blocks are different from each other in the chemical structure, or in the steric configuration, and two or more monomers are included. The styrene-ethylene-butylene-styrene block copolymer refers to a polymer formed by linearly connecting styrene-based repeating unit block-ethylene-based repeating unit block-butylene-based repeating unit block-styrene-based repeating unit block. The example of the structure of the styrene-butylene-styrene block copolymer is not significantly limited, however, for example, may include the structure of the following Chemical Formula 11:

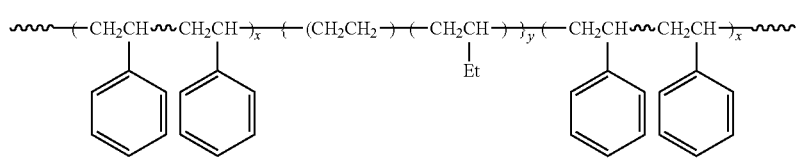

[Chemcial Formula 11]

wherein x and y is independently an integer of 1 or more.

In addition, on the styrene-ethylene-butylene-styrene block copolymer, a certain compound may be grafted, and copolymerized. The example of the certain compound is not significantly limited, however, for example, anhydride of dicarboxylic acid, acrylate, methacrylate, alkyl acrylate, alkyl methacrylate and the like may be used.

Meanwhile, the polymer resin composition may include an unsaturated-diene-based rubber-aromatic vinyl graft copolymer, an alkyl methacrylate-diene-based rubber-aromatic vinyl graft copolymer, an alkyl methacrylate-silicone/alkyl acrylate graft copolymer, or a mixture of two or more thereof.

The graft copolymer refers to a copolymer formed by polymerization in which to one polymer, another monomer is connected in a branch shape.

The unsaturated nitrile-diene-based rubber-aromatic vinyl graft copolymer which is in the form of a core-shell rubber may have an average particle diameter of 0.01 μm to 5 μm, a graft ratio of 5 to 90%; a glass transition temperature of core of −20° C. or less, and a glass transition temperature of shell of −20° C. or more.

The unsaturated nitrile-diene-based rubber-aromatic vinyl graft copolymer which is core-shell rubber prepared through an emulsion polymerization or bulk polymerization process has an average particle diameter of 0.01 μm to 5 μm, a graft ratio of 5 to 90%, a glass transition temperature of core of −20° C. or less; and a glass transition temperature of shell of −20° C. or more, and may or may not selectively include a functional group such as glycidyl methacrylate or maleic anhydride in the shell.

Further, in the unsaturated nitrile-diene-based rubber-aromatic vinyl graft copolymer, the unsaturated nitrile may be one or more selected from the group consisting of acrylonitrile, methacrylonitrile, ethacrylonitrile, phenylacrylonitrile, and α-chloroacrylonitrile.

In addition, in the unsaturated nitrile-diene-based rubber-aromatic vinyl graft copolymer, and the alkyl methacrylate-diene-based rubber-aromatic vinyl graft copolymer, the diene-based rubber may be a butadiene-type rubber or isoprene-type rubber.

Also, in the unsaturated nitrile-diene-based rubber-aromatic vinyl graft copolymer, and the alkyl methacrylate-diene-based rubber-aromatic vinyl graft copolymer, the aromatic vinyl may be one or more selected from the group consisting of styrene, α-methylstyrene vinyltoluene, t-butylstyrene, halogen-substituted styrene, 1,3-dimethylstyrene, 2,4-dimethylstyrene, and ethylstyrene.

Meanwhile, the core-shell rubbers may have morphology of monomodal distribution having an average particle diameter of 0.01 μm to 5 μm, or morphology of multimodal distribution having an average particle diameter of 0.01 μm to 5 μm.

In addition, in the unsaturated nitrile-diene-based rubber-aromatic vinyl graft copolymer, and the alkyl methacrylate-diene-based rubber-aromatic vinyl graft copolymer, the alkyl acrylate may be methyl methacrylate, ethyl methacrylate, propyl methacrylate, isopropyl methacrylate, butyl methacrylate, or a mixture of two or more thereof.

In the alkyl methacrylate-silicone/alkyl acrylate graft copolymer, 'silicone/alkyl acrylate' refers to a copolymer obtained by polymerizing a mixture of a silicone monomer and an alkyl acrylate monomer.

The silicone may be dimethyl siloxane, hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyl tetraphenyl cyclotetrasiloxane, octaphenyl cyclotetrasiloxane, or a mixture of two or more thereof.

In addition, in the alkyl methacrylate-silicone/alkyl acrylate graft copolymer, the alkyl acrylate may be methyl acrylate, ethyl acrylate, propyl acrylate, isopropyl acrylate, butyl methacrylate, or a mixture of two or more thereof.

Preferably, the unsaturated nitrile-diene-based rubber-aromatic vinyl graft copolymer may be acrylonitrile-butadiene-styrene graft copolymer, and the alkyl methacrylate-diene-based rubber-aromatic vinyl graft copolymer may be a methyl methacrylate-butadiene-styrene graft copolymer. In addition, the alkyl methacrylate-silicone/alkyl acrylate graft copolymer may be a methyl methacrylate-silicone/butyl acrylate graft copolymer.

Meanwhile, the polyester resin may include polytrimethylene terephthalate. The polytrimethylene terephthalate may have a weight average molecular weight (evaluated by GPC) of 10,000 g/mol to 150,000 g/mol.

In addition, the polycarbonate resin may have a glass transition temperature of 50° C. to 200° C., and a weight average molecular weight (evaluated by GPC) of 10,000 g/mol to 200,000 g/mol.

Further, the polymer resin composition may further include one or more selected from the group consisting of an unsaturated nitrile-aromatic vinyl-glycidyl methacrylate-based compatibilizer, an unsaturated nitrile-aromatic vinyl-maleic anhydride acid-based compatibilizer, a saturated ethylene-alkyl acrylate-glycidyl methacrylate-based compatibilizer, and a carbodiimide-based anti-hydrolysis agent.

In the above, the unsaturated nitrile-aromatic vinyl-glycidyl methacrylate-based compatibilizer may be included at 15 wt % or less, the unsaturated nitrile-aromatic vinyl-maleic anhydride acid-based compatibilizer may be included at 15 wt % or less, the saturated ethylene-alkyl acrylate-glycidyl methacrylate-based compatibilizer may be included at 15 wt % or less, and the carbodiimide-based anti-hydrolysis agent may be included at 10 wt % or less.

The alkyl acrylate may be one or more selected from the group consisting of methyl acrylate, ethyl acrylate, propyl acrylate, isopropyl acrylate, butyl acrylate, hexyl acrylate, octyl acrylate, and 2-ethylhexyl acrylate.

In addition, the unsaturated nitrile-aromatic vinyl-glycidyl methacrylate-based compatibilizer may have a glass transition temperature of 20 to 200° C., and a weight average molecular weight (evaluated by GPC) of 200 to 300,000 g/mol, and may be selectively replaced with the aromatic vinyl-glycidyl methacrylate.

In the above, the unsaturated nitrile-aromatic vinyl-maleic anhydride acid-based compatibilizer may have a glass transition temperature of 20 to 200° C., and a weight average molecular weight (evaluated by GPC) of 200 to 300,000 g/mol, and the saturated ethylene-alkyl acrylate-glycidyl methacrylate-based compatibilizer may have a glass transition temperature of −150 to 200° C., and a weight average molecular weight (evaluated by GPC) of 200 to 300,000 g/mol.

In addition, the carbodiimide-based anti-hydrolysis agent may have a weight average molecular weight (evaluated by GPC) of 50 to 300,000 g/mol, and be represented by the following Chemical Formula 1 or 2:

$R_1—N=C=N—R_2$      [Chemical Formula 1]

wherein $R_1$ and $R_2$ are independently of each other a hydrogen atom, an alkyl group having 1 to 20 carbon atoms or an aryl group having 6 to 36 aryl group,

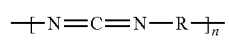    [Chemical Formula 2]

wherein R is an alkyl group having 1 to 20 carbon atoms or an aryl group having 6 to 36 carbon atoms; and n is an integer of 2 to 30,000, representing an average polymerization degree.

Meanwhile, the polymer resin composition may further include one or more additives selected from the group consisting of an antioxidant, a lubricant, a photostabilizer, a photoabsorbent, a transesterification inhibitor, and an anti-hydrolysis agent.

The additive may be included at 10 wt % or less, relative to the resin composition.

In addition, the hindered phenol-based antioxidant may have a weight average molecular weight (evaluated by GPC) of 50 to 300,000 g/mol.

Further, the phosphite-based antioxidant may be selected from the group consisting of Formulae 3 to 5:

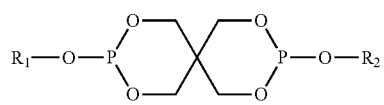

[Chemical Formula 3]

wherein $R_1$ and $R_2$ are independently of each other a substituted or unsubstituted alkyl group having 1 to 40 carbon atoms or a substituted or unsubstituted aryl group having 6 to 40 aryl group,

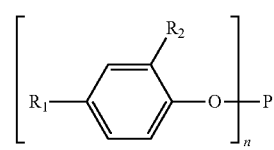

[Chemical Formula 4]

wherein $R_1$ and $R_2$ are independently of each other a substituted or unsubstituted alkyl group having 1 to 40 carbon atoms or a substituted or unsubstituted aryl group having 6 to 40 aryl group; and n is an integer of 1 or more, representing a substituted repeating unit,

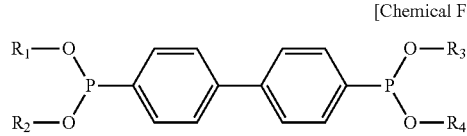

[Chemical Formula 5]

wherein $R_1$, $R_2$, $R_3$ and $R_4$ are independently of one another a substituted or unsubstituted alkyl group having 1 to 40 carbon atoms or a substituted or unsubstituted aryl group having 6 to 40 aryl group.

Meanwhile, the thioester-based antioxidant may be a compound represented by the following Chemical Formula 6 or 7:

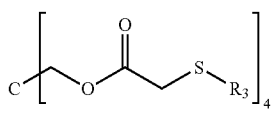
[Chemical Formula 6]

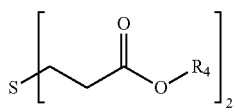
[Chemical Formula 7]

wherein $R_3$ and $R_4$ are independently of each other a substituted or unsubstituted alkyl group having 1 to 40 carbon atoms or a substituted or unsubstituted aryl group having 6 to 40 aryl group.

The lubricant may be one or more selected from the group consisting of a metal stearate-based lubricant, an amide-based lubricant, a paraffin-based lubricant, and an ester-based lubricant.

The photostabilizer and photoabsorbent may be a HALS-based photostabilizer, a benzotriazole-based photoabsorbent or a benzophenone-based photoabsorbent.

Meanwhile, the transesterification reaction inhibitor may be a phosphorous compound including a minimum hydroxyl functional group and an alkyl ester functional group, or a hydrazine compound including the unit represented by the following Chemical Formula 8:

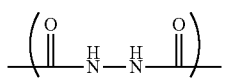
[Chemical Formula 8]

Also, the polymer resin composition according to the present invention may further include an additive selected from the group consisting of a chain extender or coupling agent including a glycidyl methacrylate unit, an inorganic additive, a filler, a dye, a pigment, and a coloring agent.

Meanwhile, according to another embodiment of the invention, a molded article including the polymer resin composition may be provided.

The polymer resin molded article may be used in the parts of automobiles, electrical and electronic equipment, home appliances, office equipment, and household goods. Specifically, the polymer resin may be used in instrument panel module-related plastic parts, door trim-related plastic parts, lamp housing-related parts, wheel cover-related parts, garnish-related parts for an interior/exterior automobile, door handle lever parts, and the like, in the automobile, and in mobile phone housing parts, electronic dictionary housing parts, CD player parts, MP3-related parts, electronic calculator housing parts and the like, in the electrical and electronic equipment.

In addition, the polymer resin may be used in refrigerator internal-related parts, washing machine-related plastic parts, air conditioner housing parts, cleaner housing parts, mixer housing part, bidet-related parts and the like in the home appliance, all-in-one interior/exterior related parts, fax interior/exterior related parts, scanner interior/exterior related part and the like in the office equipment, and kitchen-related plastic parts, bathroom-related plastic parts and the like in the household goods.

Hereinafter, the preferred examples of the present invention will be described. However, these examples are only to illustrate the present invention and is not to be construed as limiting a scope of the present invention.

EXAMPLES 1 TO 5: POLYMER RESIN COMPOSITION

Example 1

Using a twin screw extruder (Φ:40 mm, L/D=40), to 100% or a resin consisting of 20 wt % of an acrylonitrile-butadiene-styrene graft copolymer, 10 wt % of polytrimethylene terephthalate, 3 wt % of a styrene-ethylene-butylene-styrene block copolymer, and 67% of polycarbonate, 0.5 wt % of acrylonitrile-styrene-glycidyl methacrylate, 0.2 wt % of a phenol-based primary oxidation stabilizer, and 0.2 wt % of a phosphite-based secondary oxidation stabilizer were added, and extrusion was uniformly carried out, thereby manufacturing a pellet.

In the above, the acrylonitrile-butadiene-styrene graft copolymer was HR-181 which is a graft ABS product in a core-shell rubber available from Kumho Petrochemical Co., Ltd., the polytrimethylene terephthalate was PTT available from SK Chemicals, the styrene-ethylene-butylene-styrene block copolymer was H-1052 available from Asahi Kasei Corporation, Japan, the polycarbonate was 3030PJ from Samyang Corporation, Republic of Korea, the acrylonitrile-styrene-glycidyl methacrylate was SAG-005 available from SUNNY FC, China, the phenol-based primary oxidation stabilizer was AO-60 available from Adeka Corporation, Japan, and the phosphite-based secondary oxidation stabilizer was Irgafos 168 from Clariant, Switzerland.

Example 2

Using a twin screw extruder (Φ:40 mm, L/D=40), to 100% or a resin consisting of 15 wt % of an acrylonitrile-butadiene-styrene graft copolymer, 15 wt % of polytrimethylene terephthalate, 5 wt % of a styrene-ethylene-butylene-styrene block copolymer, and 65% of polycarbonate, 0.5 wt % of acrylonitrile-styrene-glycidyl methacrylate, 0.2 wt % of a phenol-based primary oxidation stabilizer, and 0.2 wt % of a phosphite-based secondary oxidation stabilizer were added, and extrusion was uniformly carried out, thereby manufacturing a pellet.

In the above, the acrylonitrile-butadiene-styrene graft copolymer was HR-181 which is a graft ABS product in a core-shell rubber available from Kumho Petrochemical Co., Ltd., the polytrimethylene terephthalate was PTT available from SK Chemicals, the styrene-ethylene-butylene-styrene block copolymer was H-1052 available from Asahi Kasei Corporation, Japan, the polycarbonate was 3030PJ from Samyang Corporation, Republic of Korea, the acrylonitrile-styrene-glycidyl methacrylate was SAG-005 available from SUNNY FC, China, the phenol-based primary oxidation stabilizer was AO-60 available from Adeka Corporation, Japan, and the phosphite-based secondary oxidation stabilizer was Irgafos 168 from Clariant, Switzerland.

Example 3

Using a twin screw extruder (Φ:40 mm, L/D=40), to 100% or a resin consisting of 15 wt % of a methyl methacrylate-butadiene-styrene graft copolymer, 20 wt % of polytrimethylene terephthalate, 5 wt % of a styrene-ethylene-butylene-styrene block copolymer, and 60% of polycarbonate, 0.5 wt % of acrylonitrile-styrene-glycidyl methacrylate, 0.2 wt % of a phenol-based primary oxidation stabilizer, and 0.2 wt % of a phosphite-based secondary oxidation stabilizer were added, and extrusion was uniformly carried out, thereby manufacturing a pellet.

In the above, the methyl methacrylate-butadiene-styrene graft copolymer was M-511 which is an MBS product in a core-shell rubber form available from Kaneka Corporation, Japan, the polytrimethylene terephthalate was PTT available from SK Chemicals, the styrene-ethylene-butylene-styrene block copolymer was H-1052 available from Asahi Kasei Corporation, Japan, the polycarbonate was 3030PJ from Samyang Corporation, Republic of Korea, the acrylonitrile-styrene-glycidyl methacrylate was SAG-005 available from SUNNY FC, China, the phenol-based primary oxidation stabilizer was AO-60 available from Adeka Corporation, Japan, and the phosphite-based secondary oxidation stabilizer was Irgafos 168 from Clariant, Switzerland.

Example 4

Using a twin screw extruder (Φ:40 mm, L/D=40), to 100% or a resin consisting of 22 wt % of an acrylonitrile-butadiene-styrene graft copolymer, 20 wt % of polytrimethylene terephthalate, 3 wt % of a styrene-ethylene-butylene-styrene block copolymer, and 55% of polycarbonate, 0.5 wt % of acrylonitrile-styrene-glycidyl methacrylate, 0.2 wt % of a phenol-based primary oxidation stabilizer, and 0.2 wt % of a phosphite-based secondary oxidation stabilizer were added, and extrusion was uniformly carried out, thereby manufacturing a pellet.

In the above, the acrylonitrile-butadiene-styrene graft copolymer was HR-181 which is a graft ABS product in a core-shell rubber available from Kumho Petrochemical Co., Ltd., the polytrimethylene terephthalate was PTT available from SK Chemicals, the styrene-ethylene-butylene-styrene block copolymer was H-1052 available from Asahi Kasei Corporation, Japan, the polycarbonate was 3030PJ from Samyang Corporation, Republic of Korea, the acrylonitrile-styrene-glycidyl methacrylate was SAG-005 available from SUNNY FC, China, the phenol-based primary oxidation stabilizer was AO-60 available from Adeka Corporation, Japan, and the phosphite-based secondary oxidation stabilizer was a S-9228 product available from Dover Corporation, U.S.A.

Example 5

Using a twin screw extruder (Φ:40 mm, L/D=40), to 100% or a resin consisting of 22 wt % of an acrylonitrile-butadiene-styrene graft copolymer, 25 wt % of polytrimethylene terephthalate, 3 wt % of a styrene-ethylene-butylene-styrene block copolymer, and 50% of polycarbonate, 0.5 wt % of acrylonitrile-styrene-glycidyl methacrylate, 0.2 wt % of a phenol-based primary oxidation stabilizer, and 0.2 wt % of a phosphite-based secondary oxidation stabilizer were added, and extrusion was uniformly carried out, thereby manufacturing a pellet.

In the above, the acrylonitrile-butadiene-styrene graft copolymer was HR-181 which is a graft ABS product in a core-shell rubber available from Kumho Petrochemical Co., Ltd., the polytrimethylene terephthalate was PTT available from SK Chemicals, the styrene-ethylene-butylene-styrene block copolymer was H-1052 available from Asahi Kasei Corporation, Japan, the polycarbonate was 3030PJ from Samyang Corporation, Republic of Korea, the acrylonitrile-styrene-glycidyl methacrylate was SAG-005 available from SUNNY FC, China, the phenol-based primary oxidation stabilizer was AO-60 available from Adeka Corporation, Japan, and the phosphite-based secondary oxidation stabilizer was a S-9228 product available from Dover Corporation, U.S.A.

COMPARATIVE EXAMPLES 1 TO 5: POLYMER RESIN COMPOSITION

Conventional thermal resistant ABS and PC/ABS products were the comparison targets, as follows:
Comparative Example 1: an ABS product of high load (1.82 M) having thermal resistance at 100° C.
Comparative Example 2: a PC/ABS product having a polycarbonate content of 50%
Comparative Example 3: a PC/ABS product having a polycarbonate content of 60%
Comparative Example 4: a PC/ABS product having a polycarbonate content of 70%
Comparative Example 5: a PC/ABS/PBT product (polycarbonate 60%, ABS 30%, PBT 10%)

EXPERIMENTAL EXAMPLES: PHYSICAL PROPERTY MEASUREMENT OF MOLDED ARTICLE MANUFACTURED FROM POLYMER RESIN COMPOSITION

The pellets manufactured according to above Examples 1 to 5, and Comparative Examples 1 to 5 were injected identically at an injection temperature of 250° C. using an injector, and then the injected specimens were conditioned at 23±2° C. under a condition of relative humidity of 50±5%, and the physical properties were measured as follows. The results are shown in the following Tables 1 and 2:

Experimental Example 1: Impact Resistance Measurement

According to ASTM D 256, a specimen for measurement was produced, and an impact strength value was measured, using an Izod impact machine (Impact Tester, Toyoseiki).

Experimental Example 2: Tensile Property Measurement

According to ASTM D 638, a specimen for measurement was produced, and tensile strength, and elongation were measured, using a Universal Testing Machine (Zwick Roell Z010).

Experimental Example 3: Flexural Property Measurement

According to ASTM D 790, a specimen for measurement was produced, and flexural strength and flexural modulus were measured, using a Universal Testing Machine (Zwick Roell Z010).

Experimental Example 4: Thermal Resistance Measurement

According to ASTM D 648, a specimen for measurement was produced, and thermal resistance was measured, using a thermal resistance tester (HDT Tester, Toyoseiki).

Experimental Example 5: Chemical Resistance Evaluation of Molded Article Manufactured from Polymer Resin Composition The pellets manufactured according to above Examples 1 to 5, and Comparative Examples 1 to 5 were injected identically at an injection temperature of 250° C. using an injector, and then the injected tensile strength specimens were conditioned at 23±2° C. under a condition of relative humidity of 50±5% for 24 hours, and were measured at tensile strength test (the evaluation of tensile strength before test).

And the evaluation of tensile strength after test was carried out in accordance with the following method:

① A chemical resistant test fixture was manufactured at critical deformation of 2.2%, and the tensile specimen was fixed with the test fixture.

② The tensile specimen was coated with an aromatic/aliphatic chemical blend product or a UV blocker for 1 minute, and then left at 23±2° C. for 72 hours.

③ After 72 hours at 23±2° C., tensile strength after test was measured, and a tensile strength loss rate represented by the following Formula was calculated, thereby comparing and judging the chemical resistance:

Tensile strength loss rate (%)=[(tensile strength before test−tensile strength after test/tensile strength before test]×100  [General Formula 1]

In the above, the aromatic/aliphatic chemical blend contains 10 to 90 wt % of ethanol, and further contains one or more selected from the group consisting of the following detailed components:

Detailed components: aromatic and aliphatic alcohols, aliphatic and aromatic esters, aromatic aldehydes, unsaturated hydrocarbons, saturated hydrocarbons, aliphatic amines, aliphatic diamines, and terpenes.

In addition, in the above, the UV blocker was commonly available in the market.

TABLE 1

| Classification | Unit | Example 1 | Example 2 | Example 3 | Example 4 | Example 5 |
|---|---|---|---|---|---|---|
| Izod impact strength (⅛") | J/m | 640 | 620 | 660 | 650 | 645 |
| Izod impact strength (¼") | J/m | 570 | 560 | 550 | 540 | 545 |
| Tensile strength | kg/cm² | 460 | 480 | 470 | 460 | 465 |
| Elongation (%) | % | 105 | 115 | 120 | 110 | 115 |
| Thermal resistance (1.82M) | ° C. | 120 | 118 | 114 | 110 | 107 |
| Flexural strength | kg/cm² | 800 | 820 | 830 | 800 | 810 |
| Flexural modulus | kg/cm² | 20,000 | 20,500 | 20,200 | 20,050 | 21,000 |
| Chemical resistance | | Result | | | | |
| Tensile strength loss rate (%) | ① | 6 | 5 | 4 | 6 | 5 |
| | ② | 2 | 2 | 2 | 3 | 2 |

* ①: aromatic/aliphatic chemical blend of alcohol base
* ②: UV blocker

TABLE 2

| Classification | Unit | Comparative Example 1 | Comparative Example 2 | Comparative Example 3 | Comparative Example 4 | Comparative Example 5 |
|---|---|---|---|---|---|---|
| Izod impact strength (⅛") | J/m | 240 | 600 | 550 | 650 | 640 |
| Izod impact strength (¼") | J/m | 180 | 500 | 450 | 550 | 530 |
| Tensile strength | kg/cm² | 475 | 440 | 550 | 550 | 460 |
| Elongation (%) | % | 20 | 110 | 100 | 105 | 110 |
| Thermal resistance (1.82M) | ° C. | 100 | 100 | 105 | 110 | 100 |
| Flexural strength | kg/cm² | 650 | 600 | 780 | 780 | 790 |
| Flexural modulus | kg/cm² | 21,500 | 17,000 | 22,000 | 22,000 | 20,000 |
| Chemical resistance | | Result | | | | |
| Tensile strength loss rate (%) | ① | 55 | 50 | 35 | 52 | 15 |
| | ② | 60 | 53 | 60 | 55 | 18 |

* ①: aromatic/aliphatic chemical blend of alcohol base
* ②: UV blocker

As seen from the above measurement result, it was found out that the thermal resistance, impact resistance and chemical resistance of the Examples were better than those of the Comparative Examples. Therefore, it was found out that the polymer resin composition according to the present invention has the components which are environment-friendly, and may represent improved high thermal resistance or impact resistance, and also excellent resistance to an environment stress crack property.

What is claimed is:

1. A polymer resin composition comprising:
   one or more copolymer selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer;
   one or more compatibilizers selected from the group consisting of an unsaturated nitrile-aromatic vinyl-glycidyl methacrylate-based compatibilizer, an unsaturated nitrile-aromatic vinyl-maleic anhydride acid-based compatibilizer, and a saturated ethylene-alkyl acrylate-glycidyl methacrylate-based compatibilizer;
   a hindered phenol-based antioxidant;
   a phosphite-based antioxidant according to a chemical formula selected from the group consisting of Chemical Formula 3, Chemical Formula 4, and Chemical Formula 5;

a polyester resin;

a polycarbonate resin; and a block copolymer including two or more alkylene-based repeating units having 2 to 10 carbon atoms and an aromatic vinyl-based repeating unit, wherein, in Chemical Formula 3, $R_1$ and $R_2$ are each independently selected from the group consisting of a substituted alkyl group having 1 to 40 carbon atoms, an unsubstituted alkyl group having 1 to 40 carbon atoms, a substituted aryl group having 6 to 40 carbon atoms, and an unsubstituted aryl group having 6 to 40 carbon atoms, wherein, in Chemical Formula 4, n is an integer greater than or equal to 1 and $R_1$ and $R_2$ are each independently selected from the group consisting of a substituted alkyl group having 1 to 40 carbon atoms, an unsubstituted alkyl group having 1 to 40 carbon atoms, a substituted aryl group having 6 to 40 carbon atoms, and an unsubstituted aryl group having 6 to 40 carbon atoms, and wherein, in Chemical Formula 5, $R_1$, $R_2$, $R_3$, and $R_4$ are each independently selected from the group consisting of a substituted alkyl group having 1 to 40 carbon atoms, an unsubstituted alkyl group having 1 to 40 carbon atoms, a substituted aryl group having 6 to 40 carbon atoms, and an unsubstituted aryl group having 6 to 40 carbon atoms

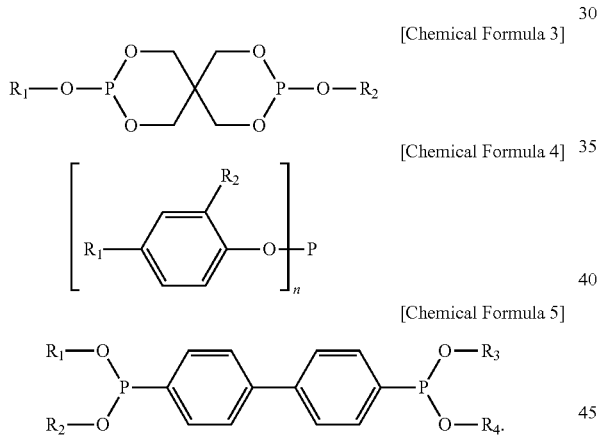

[Chemical Formula 3]

[Chemical Formula 4]

[Chemical Formula 5]

2. The polymer resin composition of claim 1, wherein the polymer resin composition has a tensile strength loss rate represented by the following General Formula 1 is 0.5% to 10%:

Tensile strength loss rate (%)=[(tensile strength before test−tensile strength after test/tensile strength before test]×100,  [General Formula 1]

wherein the tensile strength after test are measured as follows:

a pellet prepared by uniformly extruding the polymer resin composition is injected at an injection temperature of 250° C.; the injected tensile strength specimen is conditioned at 23±2° C. under a condition of relative humidities of 50±5% for 24 hours; and then the tensile strength before test is measured, and a chemical resistant test fixture is manufactured at a critical deformation of 2.2%; the specimen is fixed by the test fixture; an aromatic/aliphatic chemical blend product or a UV blocker is applied on the specimen for 1 minute; the specimen is left at 23±2° C. for 72 hours; and then the tensile strength after test is measured, with a proviso that the aromatic/aliphatic chemical blend product includes 10 to 90 wt % of ethanol, and as a detailed component, further includes one or more selected from the group consisting of aliphatic and aromatic alcohols, aliphatic and aromatic esters, aromatic aldehydes, unsaturated hydrocarbons, saturated hydrocarbons, aliphatic amines, aliphatic diamines, and terpene.

3. The polymer resin composition of claim 1, wherein the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer are comprised at 1 wt % to 50 wt %, the polyester resin is comprised at 1 wt % to 50 wt %, the polycarbonate resin is comprised at 20 wt % to 90 wt %, and the block copolymer including two or more alkylene-based repeating units having 2 to 10 carbon atoms and an aromatic vinyl-based repeating unit is comprised at 1 wt % to 20 wt %.

4. The polymer resin composition of claim 1, wherein a weight ratio between the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and the block copolymer including two or more alkylene-based repeating units having 2 to 10 carbon atoms and an aromatic vinyl-based repeating unit is 2:1 to 10:1.

5. The polymer resin composition of claim 1, wherein the block copolymer including two or more alkylene-based repeating units having 2 to 10 carbon atoms and an aromatic vinyl-based repeating unit includes a block copolymer including an aromatic vinyl-based repeating unit, an alkylene-based repeating unit having 2 to 3 carbon atoms, and an alkylene-based repeating unit having 4 to 10 carbon atoms.

6. The polymer resin composition of claim 5, wherein the block copolymer including an aromatic vinyl-based repeating unit, an alkylene-based repeating unit having 2 to 3 carbon atoms, and an alkylene-based repeating unit having 4 to 10 carbon atoms includes 10 wt % to 30 wt % of the aromatic vinyl-based repeating unit.

7. The polymer resin composition of claim 5, wherein the block copolymer including an aromatic vinyl-based repeating unit, an alkylene-based repeating unit having 2 to 3 carbon atoms, and an alkylene-based repeating unit having 4 to 10 carbon atoms has a melt flow rate (MFR) of 8 g/10 min to 20 g/10 min under a condition of a temperature of 230° C. and a load of 2.16 kg.

8. The polymer resin composition of claim 5, wherein the block copolymer including an aromatic vinyl-based repeating unit, an alkylene-based repeating unit having 2 to 3 carbon atoms, and an alkylene-based repeating unit having 4 to 10 carbon atoms has a density of 0.78 g/cm$^3$ to 0.98 g/cm$^3$.

9. The polymer resin composition of claim 5, wherein the block copolymer including an aromatic vinyl-based repeating unit, an alkylene-based repeating unit having 2 to 3 carbon atoms, and an alkylene-based repeating unit having 4 to 10 carbon atoms includes a styrene-ethylene-butylene-styrene block copolymer.

10. The polymer resin composition of claim 1, wherein the unsaturated nitrile-diene-based rubber-aromatic vinyl graft copolymer has a structure of a core having an average particle diameter of 0.01 μm to 5 and a glass transition temperature of −20° C. or less; and a shell having a glass transition temperature of 20° C. or more.

11. The polymer resin composition of claim 1, wherein the polyester resin includes polytrimethylene terephthalate.

12. The polymer resin composition of claim 11, wherein the polytrimethylene terephthalate has a weight average molecular weight of 10,000 to 150,000.

13. The polymer resin composition of claim 1, wherein the polycarbonate resin has a glass transition temperature of 50° C. to 200° C., and a weight average molecular weight of 10,000 to 200,000.

14. The polymer resin composition of claim 1, further comprising
a carbodiimide-based anti-hydrolysis agent.

15. The polymer resin composition of claim 1, further comprising:
one or more additives selected from the group consisting of a lubricant, a photostabilizer, a photoabsorbent, a transesterification inhibitor, and an anti-hydrolysis agent.

16. A polymer resin molded article comprising the polymer resin composition of claim 1.

17. The polymer resin molded article of claim 16, wherein the polymer resin molded article has one or more uses selected from the group consisting of automotive parts, parts for electrical and electronic equipment, parts for home appliances, parts for office equipment, and parts for household goods.

* * * * *